Patented June 11, 1929.

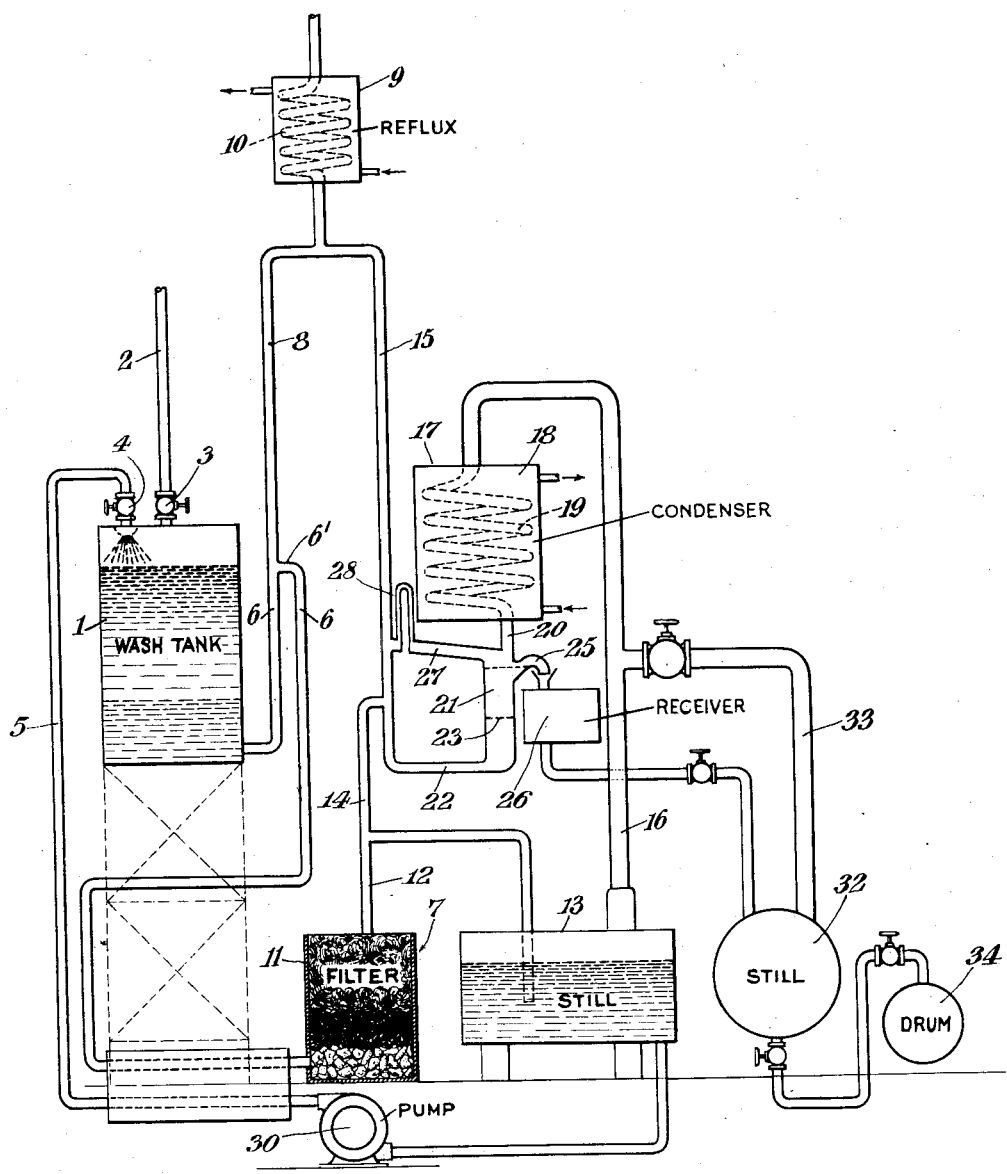

1,716,957

UNITED STATES PATENT OFFICE.

ERLING H. HAABESTAD, OF PHILADELPHIA, PENNSYLVANIA, ASSIGNOR TO THE B. A. S. COMPANY, OF PHILADELPHIA, PENNSYLVANIA, A CORPORATION OF DELAWARE.

PROCESS OF SEPARATING LIQUIDS.

Application filed July 31, 1925. Serial No. 47,233.

My invention relates to a process and apparatus for the separation of liquids and particularly the separation of liquids of which one of the liquids is soluble in water to a limited extent and volatile with steam, my invention being particularly adapted to the purification of amyl alcohol and butyl alcohol.

My invention is applicable to the separation of a liquid that is soluble in water to a limited extent and that is volatile with steam from a mixture with substances that are practically insoluble in water, but I shall describe my invention herein in connection with the separation of amyl and butyl alcohol from the substances that occur with those alcohols when they are in their crude state, such, for example, as amyl and butyl chlorides and hydrocarbons, in order that my invention may be readily and fully understood, but I do not intend that my invention shall be limited to the separation of those particular substances.

Referring to the separation of amyl and butyl alcohol merely for the purpose of disclosing my invention, the first step in the practice of my invention consists in the extraction by water of the amyl and butyl alcohol from the mixture that contains them. The next step in the practice of my invention consists in the "topping" or partial distillation of the mixture of water and alcohol. The water is advantageously returned to the extraction operation after the "topping" operation.

In the practice of my invention additional auxiliary steps may be carried out such as the filtration of water in which the alcohol has been dissolved and the drying of the recovered alcohol, the products evaporated in the drying operation being advantageously brought together with the distillate from the "topping" operation. The various operations above set out also include such auxiliary operations as condensation and collection of different products, that may be required in the complete procedure.

Other and further objects and advantages of my invention will appear from the following description taken in connection with the accompanying drawings in which the single figure shows diagrammatically apparatus embodying and whereby my invention may be practiced.

Still referring to the recovery or separation of amyl or butyl alcohol in order to simplify and facilitate the disclosure of my invention, the alcohol or other substance that is partly soluble in water and volatile with steam is introduced together with the substances with which it is mixed, such as amyl chloride or butyl chloride or hydrocarbons such as amylene into an extraction or wash tank 1. The substance to be treated is introduced into the wash tank 1 by any convenient means such as the pipe 2 that contains the valve 3. When the tank 1 is partly filled the valve 3 is closed and the valve 4 in the water supply pipe 5 is opened. The water is preferably at the temperature of about 190° F. and is preferably sprayed over the surface of the contents of tank 1. The water passes down through the crude alcohol and takes up about 2% of its weight of alcohol. The pipe 6, 6, leads from the bottom of the tank 1 to the filter 7 and when a layer of water containing dissolved alcohol has accumulated in the bottom of the tank 1 the water so charged will pass through the pipe 6 to the filter 7 when the level of liquid in the tank 1 is slightly above the bend 6′ in the pipe 6, 6. The pipe 6, 6 is vented by means of the pipe 8 which leads through a reflux condenser to the atmosphere. The reflux condenser consists merely of a water jacket 9 and a coil 10. Any vapors rising in the pipe 6, 6, will be condensed in the reflux condenser and returned to the pipe 6, 6.

The filter comprises a container 11 of any construction in which there are successive layers of limestone, charcoal and excelsior or the equivalents of those substances. The limestone is intended to neutralize any acidity that may have been formed by hydrolysis of any substance contained in the material that is being treated. The charcoal is intended to remove suspended solids such as iron oxide; and the excelsior is intended to remove suspended liquids such as hydrocarbons or amyl chloride.

Liquid passing through the filter is conducted by pipe 12 to the "topping" still 13. Pipes 14 and 15 carry any vapors from the pipe 12 to the reflux condenser and return condensate to the system.

In the still 13 water charged with alcohol or other substance to be recovered is maintained in a boiling state. Vapors pass from still 13 through pipe 16 to condenser 17 that may be of any construction such as a water container 18 through which passes a coil 19. Condensate passes from the coil 19 through the pipe 20 to the separator 21. From the bottom of the separator leads the pipe 22 that extends up to and joins the pipe 15. The pipe 14 is connected at the junction of the pipes 15 and 22 at such a level as to maintain a body of water in the separator 21, the upper level of which is indicated at 23. The alcohol or other product to be recovered passes from separator 21 through pipe 25 to receiver 26. Water condensed in the condenser 18 is thus returned through the pipes 22, 14 and 12 to the still 13. Pipe 20 through which condensate passes from condenser 19, is vented to pipe 15 by means of pipe 27 that is preferably provided with a trap 28 to prevent flow into pipe 27 of liquid that is returning in pipe 15.

Water from which the main portion of the product to be recovered has been distilled off in the still 13 is returned by means of pump 30 to the pipe 5 from which it is discharged into the tank 1. It is desirable that water drawn from still 13 be slightly cooled before being introduced into tank 1. This cooling may be partially effected by heat interchange between the liquid in pipes 5 and 6.

Condensate collected in the receiver 26 may be continuously or periodically passed to still 32. Vapors are passed from still 32 by means of pipe 33 back to condenser 18 as by connecting the pipe 33 to the pipe 16 that leads from still 13. The dried product is withdrawn and collected in a reservoir 34.

In the practice of my invention water introduced into tank 1 will absorb about 2% of such substances as amyl and about 4% of butyl alcohol. The water coming in through pipe 5 is kept below boiling temperature preferably to avoid evolution of gases that might produce pressure in tank 1. In still 13 only about 5 to 10% of the mixture passing through is distilled off and the heat required for this small amount of evaporation constitutes the only heat necessary for recovery of the desired product, slight additional heat being necessary for the drying thereof. The vapors passing from still 13 will contain 10 to 20% of the product to be recovered and the condensate contained in the condenser 18 is passed to the separator 21 where it separates into a body of the desired substance containing about 5% water and a body of water containing about 4% of the desired substance. In the drying operation the vapors arising from the still 32 consists mainly of water vapor containing about 10% of the desired substance. It is to be understood that these proportions are approximate and are to be considered merely as illustrative.

While amyl and butyl alcohol can be recovered in the practice of my invention with a high degree of economy the recovery of hexyl alcohol is less economical because of the small percentage thereof that is extracted by the water passing through the tank 1. The recovery of hexyl alcohol may, however, be accomplished in the practice of my invention.

From the foregoing it will be apparent that in the practice of my invention a substance may be recovered so long as it is partially soluble in water and volatile with steam, the water picking up some of the desired substance each time it passes through tank 1 and the predominating proportion of the desired substance being vaporized in the still 13. Each time the water passes through tank 1 it picks up as much of the desired substance as possible and each time it passes through still 13 as much of the desired substance as possible is driven off. The process is operative so long as any of the desired substance is driven off in still 13 and separated out in the separator 21.

My invention is well adapted to the purification and recovery of alcohols produced by fermentation and alcohols produced by processes involving the hydrolysis of hydrocarbon derivatives, my present invention being well adapted to the recovery and purification of alcohol produced by the hydrolysis of esters.

While I have described my invention in considerable detail and have included in that description various auxiliary operations it is understood that my invention is not limited to the details described or by the inclusion of such auxiliary operations or to the treatment of the particular alcohols referred to, but it is intended that my invention shall include such modifications and variations as fall within the hereunto appended claims.

What I claim and desire to secure by Letters Patent of the United States is:

1. In the recovery of monohydric alcohols that are soluble to some extent in water and contain four to six carbon atoms from a mixture thereof with a volatile substance substantially insoluble in water and soluble in said alcohols, the process comprising contacting such mixture with water and thereby forming a water solution of the desired alcohol, heating the solution and thereby causing a mixture of vapors of water and alcohol to pass therefrom, condensing together the vapors, by gravity separating the condensate into lighter and heavier fractions, boiling off water and such alcohol as passes off therewith from that fraction having the higher alcohol-proportion and adding the vapors resulting from the boiling operation to the vapors being condensed, returning the heavier fraction obtained by said separation and the residue of the heating operation to the contacting operation.

2. In the recovery of monohydric alcohols that are soluble to some extent in water and contain four to six carbon atoms from a mixture thereof with a volatile substance substantially insoluble in water and soluble in said alcohols, the process comprising maintaining a circulation of water, contacting such mixture with the water at one point of its cycle and thereby causing the desired alcohol to be taken into solution in the water, at a succeeding point of its cycle separating dissolved alcohol from the water by distillation and condensation, and then returning the water remaining after such separation to the circulating water.

3. In the recovery of monohydric alcohols that are soluble to some extent in water and contain four to six carbon atoms from a mixture thereof with a volatile substance substantially insoluble in water and soluble in said alcohols, the process comprising contacting such mixture with water and thereby forming a water solution of the desired alcohol, heating the solution so obtained and thereby causing a mixture of vapors of the alcohol and water to pass therefrom, condensing together said vapors, and separating the alcohol from the condensate.

4. In the recovery of monohydric alcohols that are soluble to some extent in water and contain four to six carbon atoms from a mixture thereof with a volatile substance substantially insoluble in water and soluble in said alcohols, the process comprising contacting such mixture with water and thereby forming a water solution of the desired alcohol, heating the solution so obtained and thereby causing a mixture of vapors of the alcohol and water to pass therefrom, condensing together said vapors, by gravity separating the condensate into a lighter fraction and a heavier fraction, and returning to the heating operation the fraction containing the greater water-proportion.

5. In the recovery of monohydric alcohols that are soluble to some extent in water and contain four to six carbon atoms from a mixture thereof with a volatile substance substantially insoluble in water and soluble in said alcohols, the process comprising contacting such mixture with water and thereby forming a water solution of the desired alcohol, heating the solution so obtained and thereby causing a mixture of vapors of the alcohol and water to pass therefrom, condensing together said vapors, by gravity separating the condensate into a lighter fraction and a heavier fraction, and boiling off water and such alcohol as passes off therewith from the fraction containing the lesser water-proportion.

6. In the recovery of monohydric alcohols that are soluble to some extent in water and contain four to six carbon atoms from a mixture thereof with a volatile substance substantially insoluble in water and soluble in said alcohols, the process comprising contacting such mixture with water and thereby forming a water solution of the desired alcohol, heating the solution so obtained and thereby causing a mixture of vapors of the alcohol and water to pass therefrom, condensing together said vapors, by gravity separating the condensate into a lighter fraction and a heavier fraction, boiling off water and such alcohol as passes off therewith from the fraction containing the lesser water-proportion, and passing the vapors resulting from such boiling to the condensing operation.

7. In the recovery of monohydric alcohols that are soluble to some extent in water and contain four to six carbon atoms from a mixture thereof with a volatile substance substantially insoluble in water and soluble in said alcohols, the process comprising contacting such mixture with water and thereby forming a water solution of the desired alcohol, heating the solution so obtained and thereby causing a mixture of vapors of the alcohol and water to pass therefrom, condensing together said vapors, by gravity separating the condensate into a lighter fraction and a heavier fraction, boiling off water and such alcohol as passes off therewith from the fraction containing the lesser water-proportion, passing the vapors resulting from such boiling to the condensing operation, condensing the vapors of such boiling operation and passing the resulting condensate to the separating operation.

8. In the recovery of monohydric alcohols that are soluble to some extent in water and contain four to six carbon atoms from a mixture thereof with a volatile substance substantially insoluble in water and soluble in said alcohols, the process comprising contacting such mixture with water and thereby forming a water solution of the desired alcohol, heating the solution so obtained and thereby causing a mixture of vapors of the alcohol and water to pass therefrom, condensing together said vapors, by gravity separating the condensate into a lighter fraction and a heavier fraction, returning to the heating operation the fraction containing the greater water-proportion, and returning the residue of the heating operation to contacting operation.

9. In the recovery of monohydric alcohols that are soluble to some extent in water and contain four to six carbon atoms from a mixture thereof with a volatile substance substantially insoluble in water and soluble in said alcohols, the process comprising contacting such mixture with water and thereby forming a water solution of the desired alcohol, heating the solution so obtained and thereby causing a mixture of vapors of the alcohol and water to pass therefrom, condensing together said vapors, separating the alcohol from the condensate, and returning the residue of the heating operation to the contacting operation.

10. In the recovery of monohydric alcohols that are soluble to some extent in water and contain four to six carbon atoms from a mixture thereof with a volatile substance substantially insoluble in water and soluble in said alcohols, the process comprising contacting such mixture with water and thereby forming a water solution of the desired alcohol, heating the solution so obtained and thereby causing a mixture of vapors of the alcohol and water to pass therefrom, condensing together said vapors, separating the alcohol from the condensate, and returning the residues of the heating and separating operations to the contacting operation.

11. The process of recovering alcohols having four to six carbon atoms and soluble to some extent in water from a mixture containing also chlorine compounds substantially insoluble in water, comprising contacting the mixture with water to form a water solution of the desired alcohol, passing the solution over limestone, and then separating the alcohol from the solution by distillation and condensation.

12. The process of recovering alcohols having four to six carbon atoms and soluble to some extent in water from a mixture containing also chlorine compounds substantially insoluble in water, comprising contacting the mixture with water to form a water solution of the desired alcohol, neutralizing acidity of the solution and removing suspended solids and chlorides, and then separating alcohol from the solution by distillation and condensation.

13. The process of recovering alcohols having four to six carbon atoms and soluble to some extent in water from a mixture containing also chlorine compounds substantially insoluble in water, comprising contacting the mixture with water to form a water solution of the desired alcohol, neutralizing the solution and removing suspended chlorides therefrom, and then separating alcohol from the desired solution by distillation and condensation.

14. The process of separating a first substance that is soluble to some extent in water and volatile with steam from a mixture thereof with a second substance that is volatile and is substantially insoluble in water and soluble in said first substance, comprising contacting the mixture with water and thereby extracting in the water a quantity of first substance, withdrawing from contact with the mixture the so obtained water solution of first substance and then causing to pass from said solution a mixture of vapors of water and of said first substance, condensing together said vapors, and separating the first substance from the condensate.

15. The process of separating a first substance that is soluble to some extent in water and volatile with steam from a mixture thereof with a second substance that is volatile and is substantially insoluble in water and soluble in said first substance, comprising contacting the mixture with water and thereby extracting in the water a quantity of first substance, withdrawing from contact with the mixture the so obtained water solution of first substance and then causing to pass from said solution a mixture of vapors of water and of said first substance, condensing together said vapors, separating the first substance from the condensate, and returning the residue of the solution and of the condensate into contact with the mixture.

16. The process of separating a first liquid that is soluble to some extent in water and volatile with steam from a mixture thereof with a second liquid that is volatile and is substantially insoluble in water and is soluble in said first liquid, comprising maintaining a circulation of water, contacting such mixture with the water at one point of its cycle and thereby causing the water to take first liquid into solution, at a succeeding point in its cycle separating dissolved first liquid from the water by distillation and condensation, and then returning the water after such separation to the circulating water.

17. In the separation of alcohols containing four to six carbon atoms from a mixture thereof with water, the process comprising heating the mixture and thereby causing a mixture of vapors of alcohol and water to pass therefrom, condensing together the vapors, by gravity separating the condensate into a fraction consisting mainly of alcohol mixed with some water and the fraction consisting mainly of water mixed with some alcohol, returning the second mentioned fraction to the heating operation, from the first mentioned fraction boiling off water and such alcohol as passes off therewith and adding the vapors resulting from the boiling operation to the vapors being condensed.

18. Apparatus for the recovery of alcohols that are soluble to some extent in water and volatile with steam from a mixture containing also volatile substances substantially insoluble in water and soluble in the alcohol present, comprising means for contacting water with the mixture, a heated still receiving alcohol-containing water from said contacting means, a condenser receiving vapors from said still, a gravity separator receiving liquid from said container, a second still receiving supernatant liquid from said separator, and means for conducting vapors from said second still to said condenser.

19. Apparatus for the recovery of alcohols that are soluble to some extent in water and volatile with steam from a mixture containing also volatile substances substantially insoluble in water and soluble in the alcohol present, comprising means for contacting water with the mixture, a heated still receiving alcohol-containing water from said contacting means, a condenser receiving vapors from said still, a gravity separator receiving liquid from said condenser, a second still receiving supernatant liquid from said separator, means for conducting vapors from said second still to said condenser, and means for conducting the heavier constituent from said separator and the residue from said still to said contacting means.

20. Apparatus for the recovery of alcohols that are soluble to some extent in water and volatile with steam from a mixture containing also volatile substances substantially insoluble in water and soluble in the alcohol present, comprising means for contacting water with the mixture, a heated still receiving alcohol-containing water from said contacting means, a condenser receiving vapors from said still, a gravity separator receiving liquid from said condenser, a second still receiving supernatant liquid from said separator, means for conducting vapors from said second still to said condenser, and neutralizing and filtering means between said contacting means and said first mentioned still.

In testimony whereof, I have signed my name to this specification.

ERLING H. HAABESTAD.